(12) United States Patent
Benjebbour et al.

(10) Patent No.: US 7,860,075 B2
(45) Date of Patent: Dec. 28, 2010

(54) TRANSMISSION DEVICE AND TRANSMISSION METHOD

(75) Inventors: Anass Benjebbour, Yokosuka (JP); Takahiro Asai, Yokohama (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 511 days.

(21) Appl. No.: 11/684,363

(22) Filed: Mar. 9, 2007

(65) Prior Publication Data

US 2007/0211687 A1    Sep. 13, 2007

(30) Foreign Application Priority Data

Mar. 10, 2006    (JP)    ............................. P2006-066542

(51) Int. Cl.
| | |
|---|---|
| H04B 7/212 | (2006.01) |
| H04B 7/216 | (2006.01) |
| H04B 1/26 | (2006.01) |
| H04J 3/00 | (2006.01) |
| H04L 12/28 | (2006.01) |

(52) U.S. Cl. ...................... 370/347; 370/335; 370/337; 370/338; 370/389; 455/313
(58) Field of Classification Search ................ 370/335, 370/342, 337, 347, 389, 338
See application file for complete search history.

(56) References Cited

U.S. PATENT DOCUMENTS

| 5,640,385 | A | * | 6/1997 | Long et al. | .................. | 370/335 |
| 6,539,050 | B1 | * | 3/2003 | Lee et al. | .................... | 370/342 |
| 6,735,238 | B1 | * | 5/2004 | McCorkle | .................. | 375/130 |
| 6,807,222 | B1 | | 10/2004 | Widdowson | | |

2004/0120393 A1    6/2004    Lin

FOREIGN PATENT DOCUMENTS

WO        96/06490        2/1996

OTHER PUBLICATIONS

"A Tutorial on Ultrawideband Technology", Doc.: IEEE 802.15-00/082r1, Mar. 2000, Slide 1-34. <http://grouper.ieee.org/groups/802/15/pub/2000/Mar00/00082r1P802-15_WG-UWB-Tutorial-1-XtremeSpectrum.pdf>.

(Continued)

Primary Examiner—Nick Corsaro
Assistant Examiner—Manpreet S Matharu
(74) Attorney, Agent, or Firm—Oblon, Spivak, McClelland, Maier & Neustadt, L.L.P.

(57) ABSTRACT

In the communication system, a transmission signal based on the first radio access scheme is generated, and in the communication system a transmission signal based on the second radio access scheme different from the first radio access scheme is generated. A usage status of the frequency spectrum of the transmission signal based on the first radio access scheme, as well as the known parameters of the transmission signal based on the second radio access scheme, are determined by the pulse-shaping controller. Then, the pulse-shaping controller performs control so as to pulse-shape the transmission signal based on the first radio access scheme by means of the transmit filter on the basis of the result of the above determination, or performs control so as to pulse-shape the transmission signal based on the second radio access scheme by means of the transmit filter on the basis of the result of the above determination.

6 Claims, 10 Drawing Sheets

OTHER PUBLICATIONS

Wei Wang, et al., "List-coloring Based Channel Allocation for Open-Spectrum Wireless Networks", IEEE VTC, vol. 1, 2005, 5 Pages, <http://www.cs.ucdavis.edu/~liu/paper/open-spectrum(vtc05).pdf>.

William A. Gardner, "Exploitation of Spectral Correlation in Cyclostationary Signals", 19880803; 19880803-19880805, XP010078041, Aug. 3, 1988, pp. 1-6.

* cited by examiner

TRANSMISSION DEVICE AND TRANSMISSION METHOD

BACKGROUND OF THE INVENTION

1. Field of the Invention

The present invention relates to a transmission device and a transmission method that are capable of performing wireless communication.

2. Related Background Art

Conventional wireless communication systems can maintain the signal quality thereof by being allocated dedicated frequency bands so that they do not interfere with each other. However, the frequency resources are limited; thus, the case where a plurality of systems (radio access schemes) shares the same frequency band is being considered in order to use the frequency resources freely and more efficiently. In such systems, however, it is necessary to maintain the signal quality by avoiding or suppressing interference among the spectrum sharing systems.

The existing spectrum sharing techniques are classified broadly into underlay spectrum sharing and opportunistic spectrum sharing. For underlay spectrum sharing, the interference that is caused in other incumbent systems that already use the same frequency band is maintained to a noise level or lower by dispersing the power of a signal over a large bandwidth (e.g., Ultra-Wide bands (UWB) transmission). For opportunistic spectrum sharing, the signal of every system is transmitted via a virtual channel that is created by controlling the use of time and space in order to maintain the signal quality of the systems that share the frequency resources. For details on underlay spectrum sharing and opportunistic spectrum sharing, refer to Cited Reference 1 "A Tutorial on Ultra-wideband Technology", Doc. IEEE 802.15-00/082r0, March 2000, [searched on Feb. 27, 2006], URL: http://grouper.ieee-.org/groups/802/15/pub/2000/Mar00/00082r1P802-15_WG-UWB-Tutorial-1-XtremeSpectrum.pdf", and Cited Reference 2 "Wei Wang and Xin Liu, "List-Coloring based Channel Allocation for Open-Spectrum Wireless Networks,", IEEE VTC 2005, [searched on Feb. 27, 2006], URL: http://www.cs.ucdavis.edu/~liu/paper/open-spectrum(vtc05).pdf.

However, underlay spectrum sharing has a drawback owing to its limited transmission distance because the power is kept low. On the other hand, for opportunistic spectrum sharing, this suffers from the problem that the frequency resources might be underutilized, e.g., the case of two systems using the same frequency band by time sharing where one of the systems accesses the frequency band less frequent than the other system (resources are underutilized in time), and the case where those systems use different frequency bands simultaneously but one of the systems does not access its frequency band fully (resources are underutilized in frequency).

Therefore, in conventional systems, there is a limit on spectrum utilization efficiency; thus, it is necessary to further improve the usability of spectrum in future as spectrum demand is expected to increase and radio access schemes are also expected to diversify.

SUMMARY OF THE INVENTION

Therefore, in order to solve the above problems, an objective of the present invention is to provide a transmission device and a transmission method that are capable of efficiently using frequency resources in cases where a plurality of different radio access schemes are used.

In order to solve the above problems, the transmission device of the present invention has: a first communication control module for generating a transmission signal based on a first radio access scheme; a second communication control module for generating a transmission signal based on a second radio access scheme different from the first radio access scheme; a transmission parameter determining module for determining a usage status of the frequency spectrum of the transmission signal based on the first radio access scheme that is generated by the first communication control module, and the transmission parameters (e.g., carrier frequency, bandwidth, symbol rate, etc) of the transmission signal based on the second radio access scheme that is generated by the second communication control module; pulse-shaping control module for controlling the first communication control module so as to pulse-shape the transmission signal based on the first radio access scheme that is generated by the first communication control module, or for controlling the second communication control module so as to pulse-shape the transmission signal based on the second radio access scheme that is generated by the second communication control module, on the basis of a determination result obtained by the transmission parameter determining module; adding module for generating a transmission signal by adding the pulse-shaped transmission signal based on the first radio access scheme to the pulse-shaped transmission signal based on the second radio access scheme, in case where the transmission signal based on the first radio access scheme is pulse-shaped on the basis of the control performed by the pulse-shaping control module, or for generating a transmission signal by adding the pulse-shaped transmission signal based on the second radio access scheme to the pulse-shaped transmission signal based on the first radio access scheme, in case where the transmission signal based on the second radio access scheme is pulse-shaped on the basis of the control performed by the pulse-shaping control module; and transmitting module for transmitting the transmission signal generated by the addition performed by the adding module.

Moreover, the transmission method of the present invention has: a first communication control step of generating a transmission signal based on a first radio access scheme; a second communication control step of generating a transmission signal based on a second radio access scheme different from the first radio access scheme; a transmission parameter determining step of determining the usage status of a frequency spectrum of the transmission signal based on the first radio access scheme that is generated in the first communication control step, and the transmission parameters of the transmission signal based on the second radio access scheme that is generated in the second communication control step; a pulse-shaping step of pulse-shaping the transmission signal based on the first radio access scheme that is generated in the first communication control step, or of pulse-shaping the transmission signal based on the second radio access scheme that is generated in the second communication control step, on the basis of a determination result obtained by the transmission parameter determining step; an adding step of generating a transmission signal by adding the pulse-shaped transmission signal based on the first radio access scheme to the pulse-shaped transmission signal based on the second radio access scheme, in case where the transmission signal based on the first radio access scheme is pulse-shaped in the pulse-shaping step, or of generating a transmission signal by adding the pulse-shaped transmission signal based on the second radio access scheme to the pulse-shaped transmission signal based on the first radio access scheme, in case where the transmission signal based on the second radio access scheme is pulse-shaped in the pulse-shaping step; and a transmitting step of transmitting the transmission signal generated by the addition performed in the adding step.

According to the present invention, the transmission signal based on the first radio access scheme is generated, the transmission signal based on the second radio access scheme, which is different from the first radio access scheme, is generated, and the usage status of the frequency spectrum by the first radio access scheme, as well as the transmission parameters of the second radio access scheme, are determined. Then, on the basis of this determination result, the transmission signal based on the first radio access scheme or/and the transmission signal based on the second radio access scheme is pulse-shaped. And then, a transmission signal is generated, by adding the pulse-shaped transmission signal based on the first radio access scheme to the pulse-shaped transmission signal based on the second radio access scheme, or by adding the pulse-shaped transmission signal based on the second radio access scheme to the pulse-shaped transmission signal based on the first radio access scheme. And the transmission signal generated can be transmitted. Accordingly, the utilization efficiency of frequency resources can be improved.

Moreover, in the transmission device of the present invention, it is preferred that the first communication control module generates a wideband signal as a component of the transmission signal, that the second communication control module generates a narrowband signal as another component of the transmission signal, and that the first communication control module pulse-shapes the transmission signal, which is the wideband signal, on the basis of the control performed by the pulse-shaping control module, so that spectral redundancy owing to cyclostationarity increases.

According to the present invention, the first radio access scheme uses a wideband signal, while the second access signal uses a narrowband signal, and the transmission signal based on the first radio access scheme can be pulse-shaped so that spectral redundancy owing to cyclostationarity increases. Then, both transmission signals are multiplexed. The narrowband signal parameters belonging to the second radio access scheme are not known to the wideband signal belonging to the first radio access scheme (e.g., a frequency hopping narrowband signal with a hopping pattern unknown to the wideband signal). Although interference occurs between the wideband signal and narrowband signal, this can be mitigated at the receiver side by exploiting the increased spectral redundancy (owing to cyclostationarity) of the first radio access scheme. Accordingly, the utilization efficiency of frequency resources can be improved.

Furthermore, in the transmission device of the present invention, it is preferred that the first communication control module generates a wideband signal as a component of the transmission signal, that the second communication control module generates a frequency hopping narrowband signal following a predetermined hopping pattern in a frequency band, and that the first communication control module pulse-shapes the transmission signal on the basis of the control performed by the pulse-shaping control module, so that spectral redundancy owing to cyclostationarity increases, and then performs additional pulse-shaping of this signal so that interference is avoided or minimized in the frequency band corresponding to the hopping pattern formed by the second communication control module.

Moreover, according to the present invention, the first radio access scheme generates a wideband signal, while the second radio access scheme generates a narrowband signal that has a predetermined hopping pattern which is known to the first radio access scheme, and the first radio access scheme can pulse-shape the transmission signal so that spectral redundancy owing to cyclostationarity increases, and can also further pulse-shape this transmission signal based on the first radio access scheme so that interference to the second radio access scheme is zeroed (notched) or minimized in the frequency band corresponding to the hopping pattern. Accordingly, the wideband signal can be multiplexed with the narrowband signal without causing any interference to it. The notch owing to pulse shaping at the wideband signal can be compensated for at the receiver by exploiting the increased spectral redundancy (owing to cyclostationarity). Accordingly, both radio access schemes can share the same spectrum at the same time and therefore the utilization efficiency of frequency resources can be also improved.

According to the present invention, by enabling a plurality of different radio access schemes to be shared on the same frequency band at the same time, a user belonging to the plurality of radio access schemes can be shared in the same communication device within a limited bandwidth, whereby the utilization efficiency of the frequency resources can be improved by using the frequency resources flexibly.

DESCRIPTION OF THE PREFERRED EMBODIMENTS

The present invention can be interpreted easily by considering the following detailed descriptions with reference to the attached drawings illustrating an embodiment. Embodiments of the present invention are described with reference to the attached drawings next. The same parts are applied with the same reference numerals if possible, thus the explanations thereof are omitted accordingly.

Figure 1:
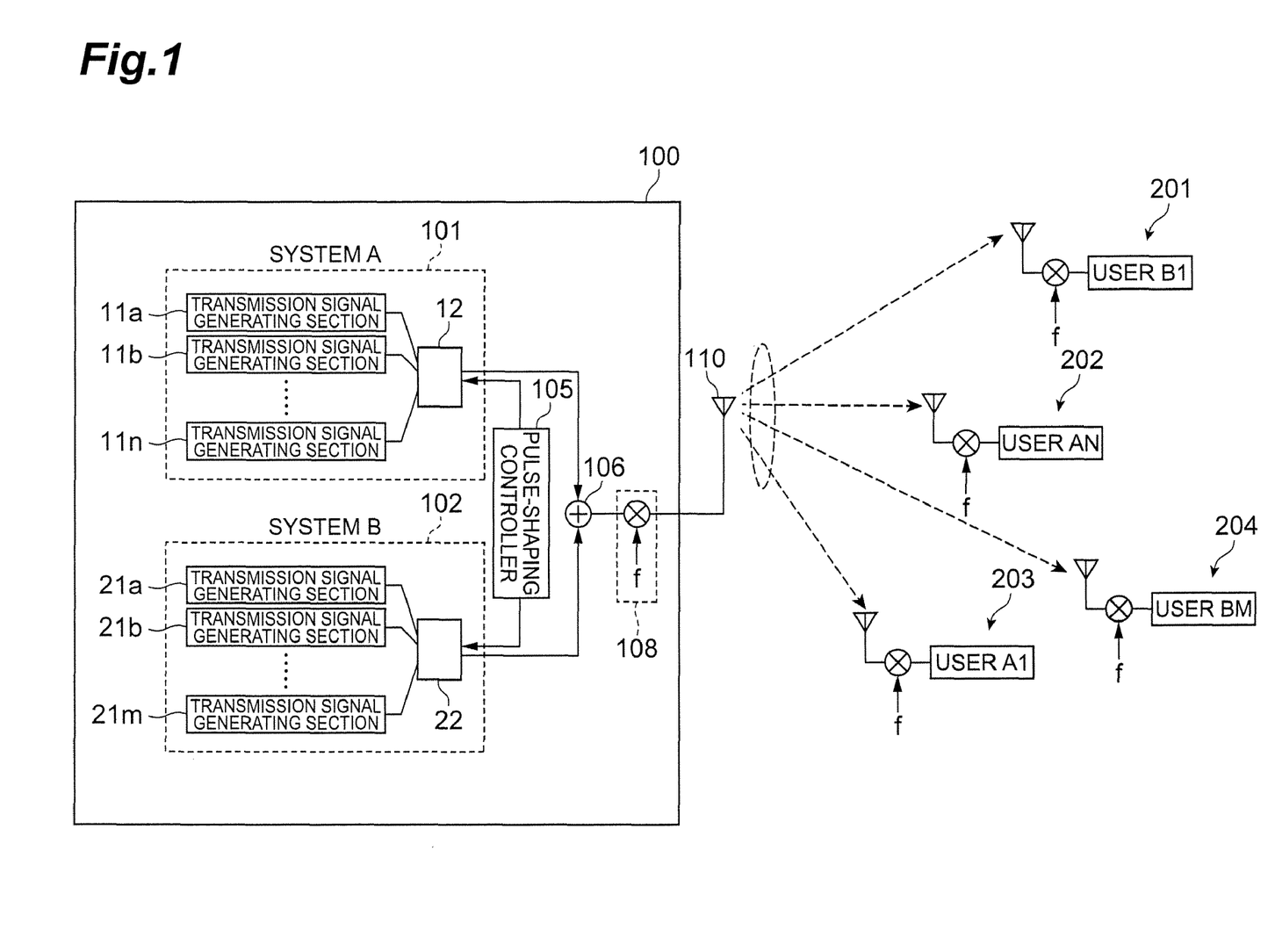
FIG. 1 is a system configuration diagram showing a wireless communication system having a base station which is a transmission device of an embodiment.

FIG. 1 is a system configuration diagram showing a wireless communication system having a base station which is a transmission device of the present embodiment. As shown in FIG. 1, a base station 100 pulse-shapes transmission signals generated by a communication system 101 and communication system 102, by means of control performed by a pulse-shaping controller 105 without causing any interference. Here, the communication system 101 and the communication system 102 are communication controllers which perform communication by means of radio access schemes that are different from each other, and which their signals are pulse-shaped so as to be able to use the same frequency band for transmitting different radio access schemes simultaneously. Moreover, the communication system 101 has transmission signal generating sections 11a through 11n for generating transmission signals corresponding to a plurality of user terminals A1 through AN, while the communication system 102 has transmission signal generating sections 21a through 21m for generating transmission signals corresponding to a plurality of user terminals B1 through BM.

The transmission signal of the communication system 101 that is pulse-shaped by the control of the pulse-shaping controller 105 and the pulse-shaped transmission signal of the communication system 102 are added up by an adder 106 to generate a transmission signal. The transmission signal generated by the adder 106 is combined with a carrier wave in a carrier wave generating section 108, and thus obtained signal is transmitted by wireless via an antenna 110.

In this manner, the base station 100 can multiplex and transmit the signal based on different radio access schemes on the same frequency band at the same time.

Each of user terminals 201-204 on a receiving side is a receiver capable of receiving the transmission signal based on each radio access scheme and capable of extracting a frequency band out of the multiplexed frequencies, the frequency band being required in each user terminal.

Figure 2:
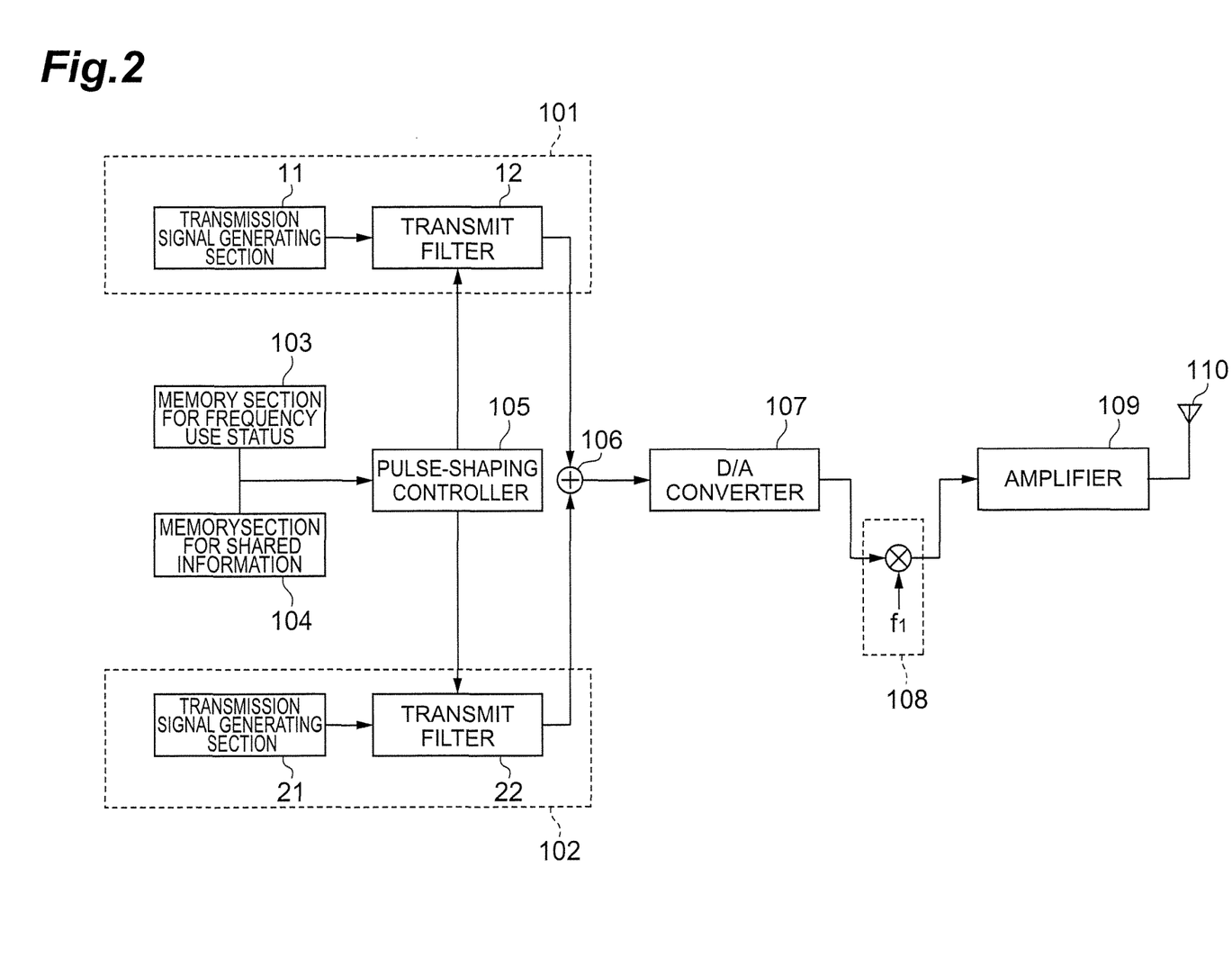
FIG. 2 is a block diagram of a base station 100.

The detailed configuration of the base station 100 is described next. FIG. 2 is a block diagram of the base station 100. This base station 100 comprises the communication system 101 (a first communication control module), the communication system 102 (a second communication control module), a memory section for frequency usage status 103, a memory section for shared information 104, the pulse-shaping controller 105 (transmission parameter determining module, pulse-shaping control module), the adder 106 (adding module), a D/A converter 107, the carrier wave generating section 108, an amplifier 109, and the antenna 110 (transmitting module). Each of these components is described hereinafter.

The communication system 101 is constituted by transmission signal generating sections 11 and a transmit filter 12. The communication system 101 has the plurality of transmission signal generating sections 11 (11a through 11n) so that the radio access schemes corresponding to the user terminals on the receiving side can be used. These transmission signal generating sections 11 generate transmission signals based on the radio access schemes corresponding to the user terminals on the receiving side. The transmit filter 12 pulse-shapes the transmission signals generated by the transmission signal generating sections 11. For example, the communication system 101 is configured so as to be able to generate a transmission signal that can use a wide frequency band. The transmit filter 12 can also pulse-shape the transmission signals on the basis of the control performed by the pulse-shaping controller 105, so that spectral redundancy owing to cyclostationarity is increased.

Figure 3:
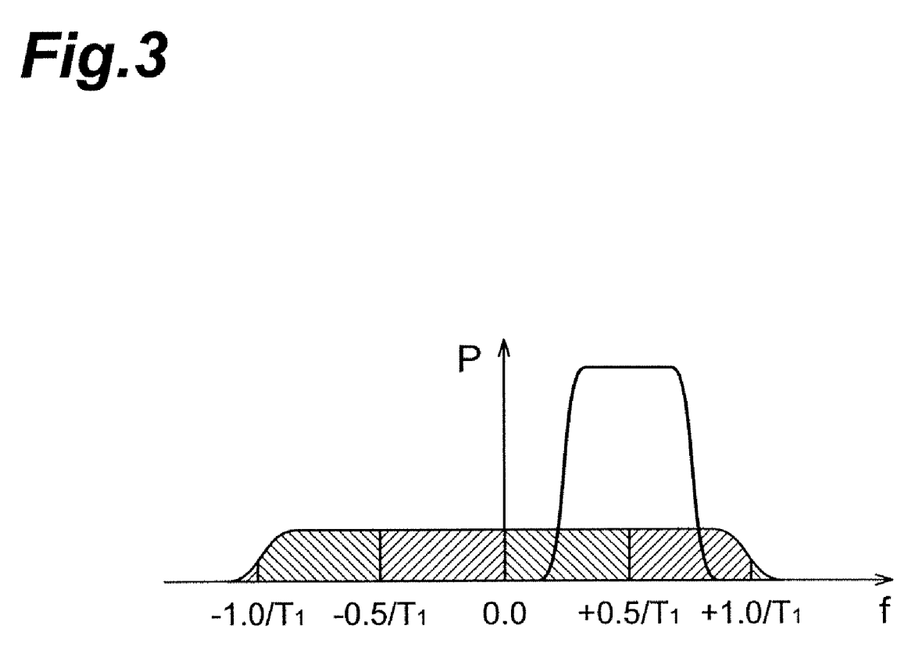
FIG. 3 is a schematic diagram showing the frequency spectrum of a transmission signal.

Here, a frequency spectrum for a transmission signal with cyclostationarity is described. FIG. 3 is a schematic diagram showing the frequency spectrum of a transmission signal. "Cyclostationarity" means that the components of the frequency spectrum that are separated from each other by a cycle frequency (e.g., symbol rate, $1/T_1$) have correlation with each other, and "a signal with cyclostationarity" is a signal whose frequency spectrum has repeated frequency patterns that have the correlation as shown in FIG. 3. The frequency patterns are repeated every $1/T_1$ for a signal transmitted with a symbol rate, $1/T_1$, as shown in FIG. 3.

The communication system 102 is constituted by transmission signal generating sections 21 and a transmit filter 22. The communication system 102 has the plurality of transmission signal generating sections 21 so that the radio access schemes corresponding to the user terminals on the receiving side can be used. It should be noted that the communication system 102 generates a transmission signal for a user terminal that use a radio access scheme different from that of the communication system 101. The transmit filter 22 pulse-shapes the transmission signals generated by the transmission signal generating sections 21. For example, the communication system 102 is configured so as to be able to generate a transmission signal formed by a frequency-hopping narrowband signal.

The pulse-shaping controller 105 performs control so as to perform predetermined pulse-shaping on the communication system 101 (transmit filter 12) and the communication system 102 (transmit filter 22). For example, the pulse-shaping controller 105 controls the transmit filter 12 so as to pulse-shape the transmission signals such that spectral redundancy owing to the property of cyclostationarity is increased. The pulse-shaping controller 105 controls the transmit filter 12 or transmit filter 22 so as to perform pulse-shaping on the basis of the information stored in the memory section for spectrum usage status 103 and the memory section for shared information 104.

The memory section for spectrum usage status 103 is a memory section for storing spectrum usage status in the communication system 101 and the communication system 102. The pulse-shaping controller 105 can control the transmit filter 12 and the transmit filter 22 in accordance with the spectrum usage status stored in the memory section for spectrum usage status 103. For example, in accordance with the spectrum usage status, the transmission signals can be prevented from being multiplexed by controlling the transmit filter 12 or the transmit filter 22 not to process the transmission signals, and the transmit filter 12 or the transmit filter 22 can be controlled so as to perform pulse-shaping such that spectral redundancy owing to cyclostationarity is increased; for this case multiplexed signals are separable at the receiver side by exploiting the property of cyclostationarity; or such that interference is avoided or mitigated.

The memory section for shared information 104 is a memory section for storing information on which transmission parameters are shared (i.e. which transmission parameters are known) among the communication system 101, communication system 102 and devices on the receiving side. For example, occupied bandwidth, the modulation method, the hopping pattern (the frequency bands where a signal hops and timing for hopping), cycle frequency and the like are stored as the transmission parameters. The pulse-shaping controller 105 can determine what kind of pulse-shaping to perform, on the basis of what parameters are known and what parameters are unknown among the two radio access schemes, which is stored in the memory section for shared information 104.

The adder 106 adds the transmission signal pulse-shaped in the communication system 101 to the pulse-shaped transmission signal generated in the communication system 102. By the way, the adder 106 has a function of adding the transmission signal pulse-shaped in the communication system 102 to the pulse-shaped transmission signal generated in the communication system 101.

The D/A converter 107 converts the transmission signals from digital to analog. The carrier wave generating section 108 places the transmission signals that are converted to analog signals onto carrier waves. The amplifier 109 amplifies the carrier waves. Then the antenna 110 transmits/outputs the carrier waves by wireless.

Figure 4:
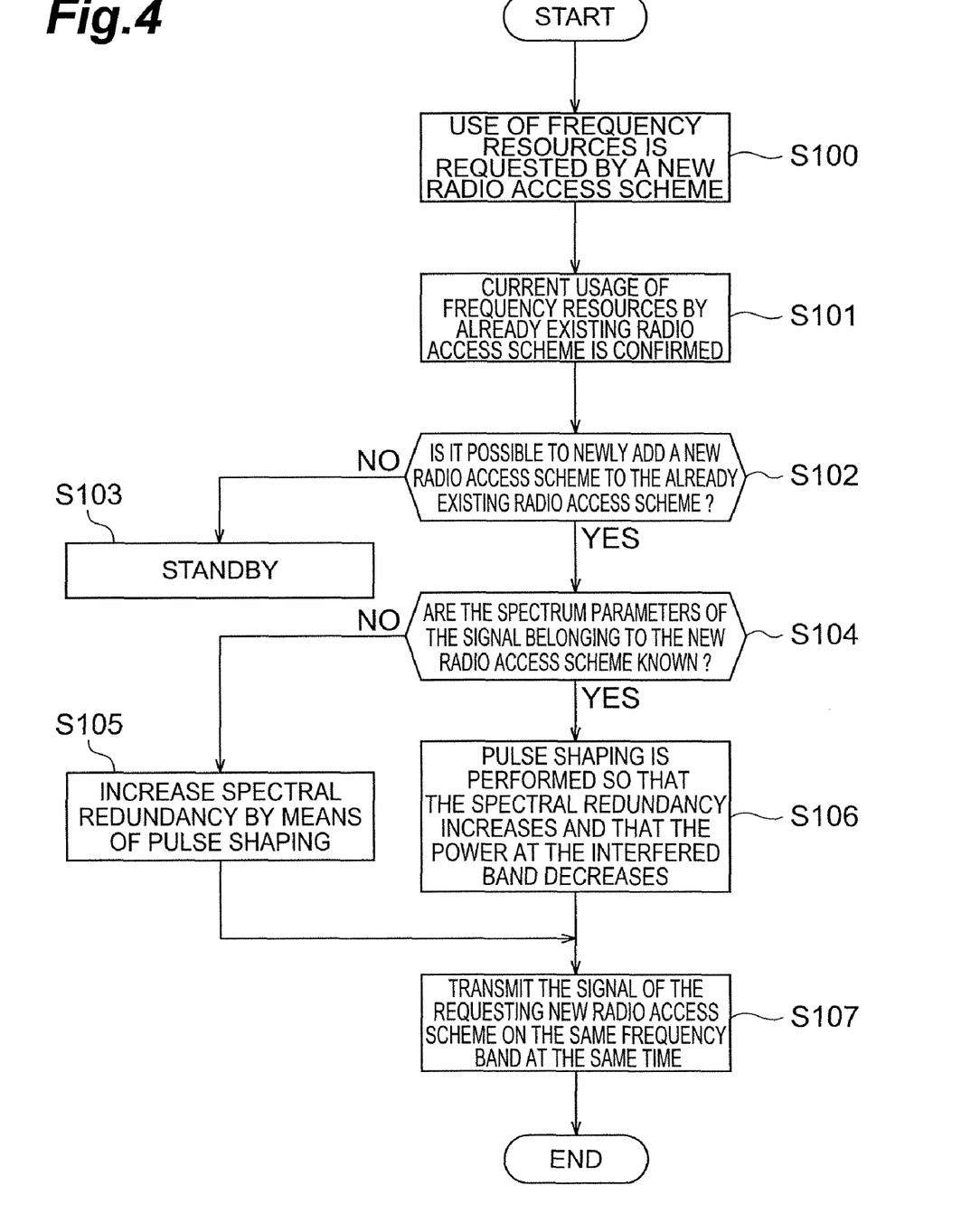
FIG. 4 is a flowchart showing the operation of the base station 100.

The operation of the base station 100 of the present embodiment is described next. FIG. 4 is a flowchart showing the operation of the base station 100. First, the use of frequency resources is requested by a new radio access scheme (S100). Such a request is made in the communication system 101 or the communication system 102. The request is then stored in the memory section for frequency usage status 103. Current usage of frequency resources by already existing radio access scheme is confirmed. That is to say, the pulse-shaping controller 105 confirms the frequency usage status of each radio access scheme which is stored in the memory section for frequency usage status 103, and the pulse-shaping controller 105 further confirms which parameters of the radio access schemes are shared, this information being stored in the memory section for shared information 104 (S101).

Then, on the basis of the information confirmed in the above manner, the pulse-shaping controller 105 determines whether a signal based on a new radio access scheme (the radio access scheme of the communication system 102, for example) can be added to the already existing radio access scheme (the radio access scheme of the communication system 101, for example) by increasing the spectral redundancy of the already existing radio access scheme (S102). Specifically, whether the transmission signal can be shared or not is determined in accordance with the information which indicates what parameters of the devices on the transmitting side are known or can be estimated in the devices at the receiver side.

Here, if the pulse-shaping controller 105 determines that the transmission signal cannot be shared (S102), the user terminals are put on standby until the usage rate of the frequency resources by the radio access scheme that is already using them is changed or the priority of the radio access scheme to be newly added is improved (S103).

Also, in S102 when the pulse-shaping controller 105 determines that the transmission signal can be shared, the pulse-shaping controller 105 determines for the radio access scheme to be newly added (the radio access scheme of the communication system 102), whether spectrum parameters (e.g., hopping pattern and the like) are known or unknown (S104). Here, when the pulse-shaping controller 105 determines that the spectrum parameters of the radio access scheme to be newly added are unknown, the pulse-shaping controller 105 controls the transmit filter 12 of the communication system 101 such that spectral redundancy owing to cyclostationarity increases (S105).

Figure 5:
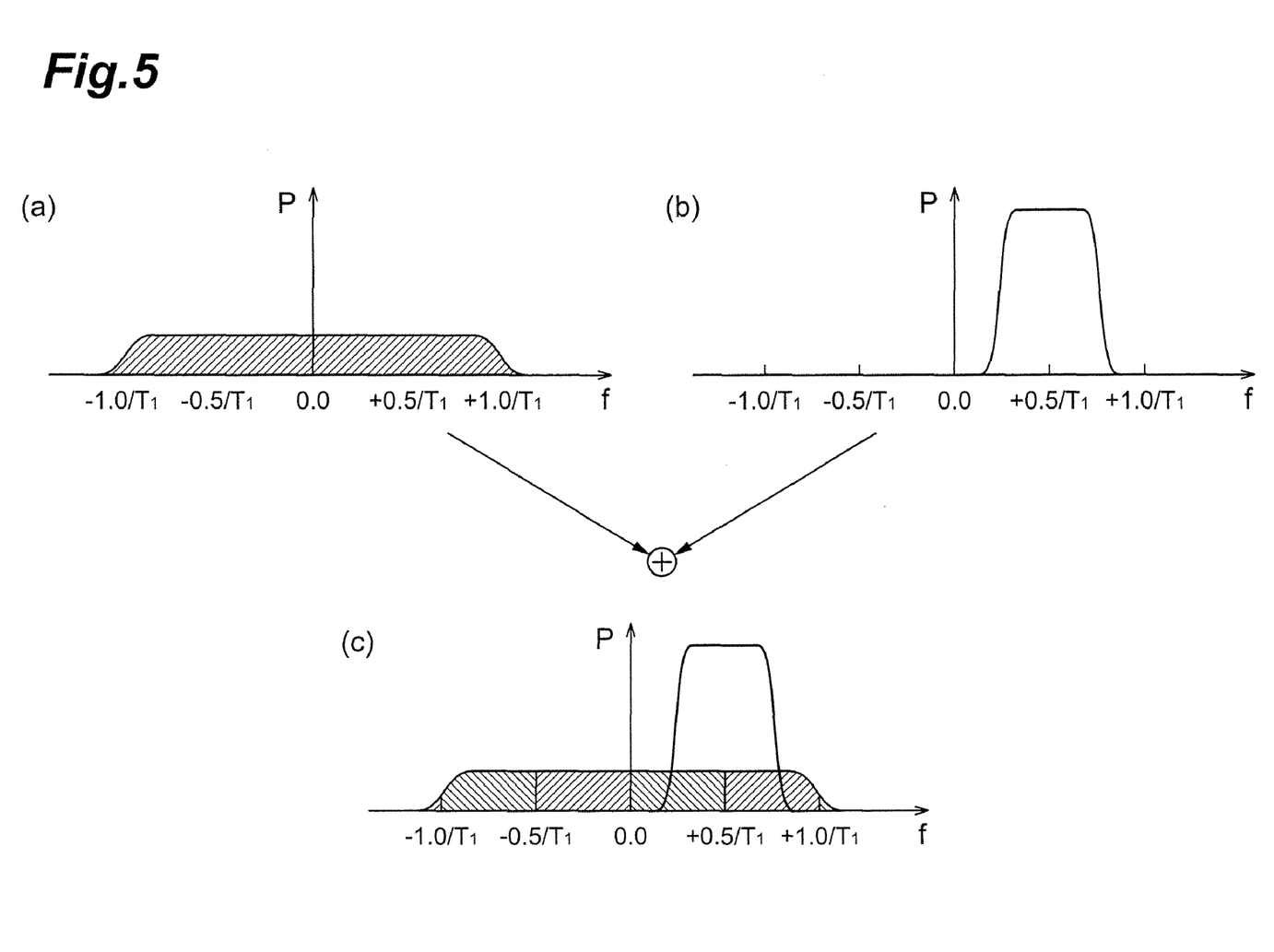
FIG. 5 is a schematic diagram showing the frequency spectrum for an example of multiplexing radio access schemes when spectral redundancy owing to cyclostationarity is increased for a wideband signal and the hopping pattern of a narrowband signal is unknown to the wideband signal.

This processing in S105 is described using a figure. FIG. 5 is a schematic diagram showing a frequency band for every radio access scheme (radio access schemes for communication system 101 and communication system 102) when spectral redundancy caused by cyclostationarity is increased.

(a) of FIG. 5 is a schematic diagram showing the frequency spectrum for the radio access scheme of the communication system 101, and (b) of FIG. 5 is a schematic diagram showing the frequency spectrum for the radio access scheme of the communication system 102. Also, (c) of FIG. 5 is a schematic diagram of transmission signals that are added up and multiplexed by the adder 106.

As shown in (a) of FIG. 5, the spectral redundancy (owing to cyclostationarity) of the transmission signal based on the radio access scheme of the communication system 101 is increased. This transmission signal, of which the spectral redundancy is increased, is added to the transmission signal based on the radio access scheme of the communication system 102, whereby the transmission signal shown in (c) of FIG. 5 is generated. As described hereinafter, the receivers on the receiving side separate each transmission signal based on the corresponding radio access scheme, perform processing on the transmission signal so as to compensate for interfered (overlapping) spectrum part, and thereby recover the transmission signal in a proper shape.

Furthermore, when the pulse-shaping controller 105 determines that the spectrum parameters of the access radio scheme to be newly added can be known (e.g., when the hopping pattern and hopping timing are stored in the memory section for shared information 104 if the second radio access scheme generates a frequency-hopping narrowband signal), the pulse-shaping controller 105 controls the transmit filter 12 of the communication system 101 such that spectral redundancy owing to cyclostationarity increases, and causes the transmit filter 12 to perform pulse shaping (notching) so that the power at the band where the new radio access scheme (i.e., the radio access scheme of the communication system 102) is to be added is reduced to 0 or as small as possible, on the basis of the hopping pattern and timing hopping information stored in the memory section for shared information 104 (S106). It should be noted in the present embodiment that pulse shaping is performed on the transmission signal of the communication system 101, but control may be also performed so as to pulse-shape the transmission signal of the communication system 102.

Figure 6:
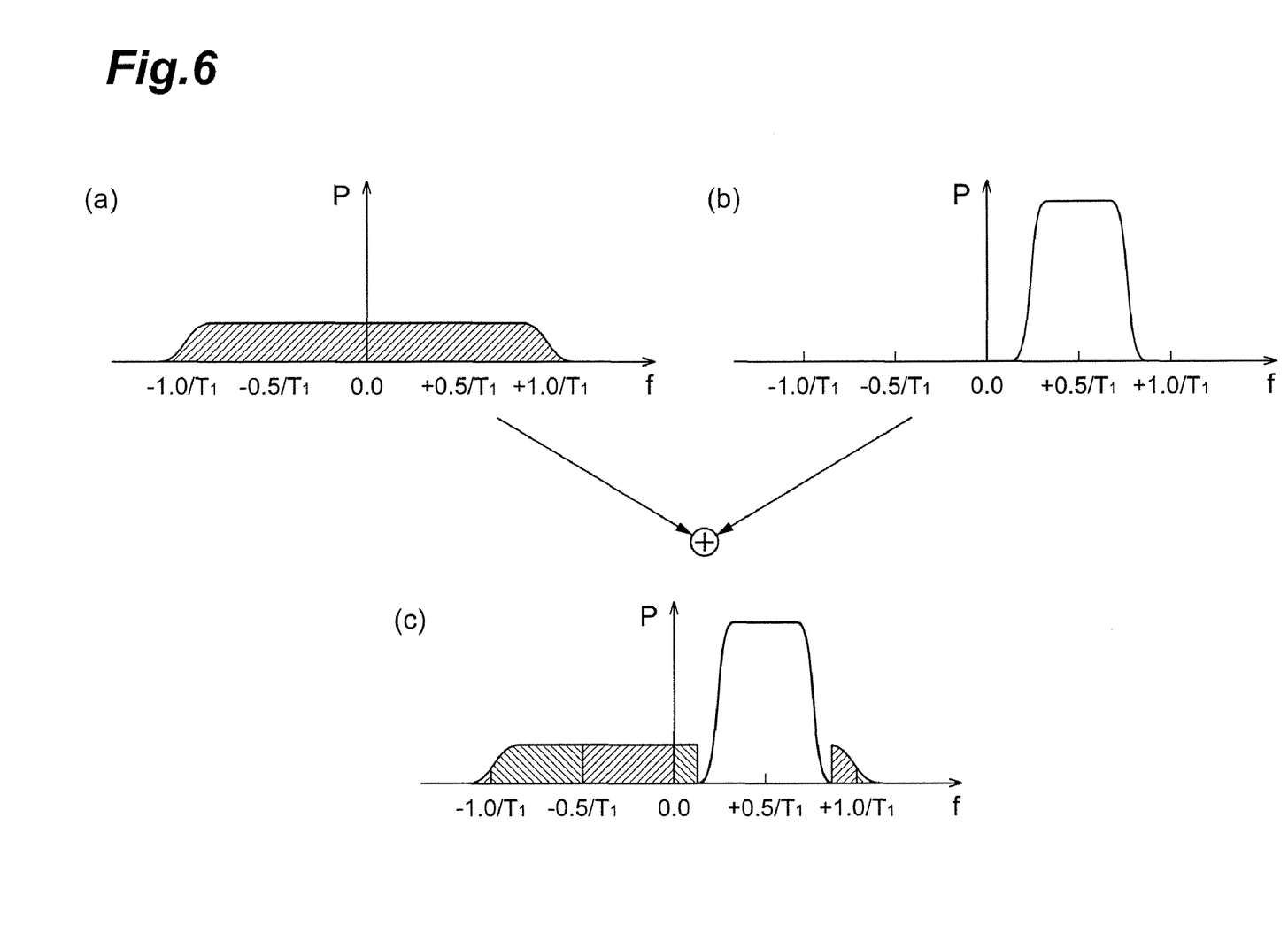
FIG. 6 is a schematic diagram showing the frequency spectrum of an example of multiplexing radio access schemes when spectral redundancy owing to cyclostationarity is increased for a wideband signal and the hopping pattern of a narrowband signal is known to the wideband signal.

This processing in S106 is described using a figure. FIG. 6 is a schematic diagram showing the frequency band of each radio access scheme (radio access schemes of the communication system 101 and communication system 102) when spectral redundancy owing to cyclostationarity is increased and additional notching is performed for the already existing radio access scheme (e.g., a wideband signal) in order to avoid interference to the newly added radio access scheme (e.g., a frequency hopping narrowband signal).

(a) of FIG. 6 is a schematic diagram showing the frequency spectrum of the radio access scheme of the communication system 101, and (b) of FIG. 6 is a schematic diagram showing a frequency spectrum of the radio access scheme of the communication system 102. Also, (c) of FIG. 6 is a schematic diagram of transmission signals that are added up and multiplexed by the adder 106.

As shown in FIG. 6, the spectral redundancy owing to cyclostationarity for the transmission signal based on the radio access scheme of the communication system 101 is increased, and the transmission signal is subjected to pulse shaping so that the power of the frequency band corresponding to the hopping pattern of the communication system 102 is reduced to 0 or as small as possible. Specifically, a notch is formed. This transmission signal, of which the spectral redundancy is increased and which is subjected to pulse shaping, is added to the transmission signal based on the radio access scheme of the communication system 102, whereby the transmission signal shown in (c) of FIG. 6 is generated. As described hereinafter, each receiver for each radio access scheme separates the multiplexed transmission signals based on the corresponding radio access scheme, and performs processing on the received signal so as to compensate for the interfered spectrum part, and thereby recover their transmission signal in an appropriate form.

This transmission signal that is subjected to pulse shaping as described above is added to the transmission signal to be newly added by the adder 106, and thus obtained transmission signal are subjected to multiplexing processing via the D/A converter 107, carrier wave generating section 108 and amplifier 109, and then transmitted/outputted via air from the antenna 110 (S107). Specifically, the multiplexed transmission signal is transmitted from the same access point on the same frequency band at the same time. It should be noted that in the present embodiment the transmission signal is multiplexed and transmitted from the same access point (base station 100), but another embodiment is possible in which a transmission signal based on one radio access scheme is subjected to pulse shaping beforehand by means of increasing cyclostationarity so that the frequency sharing spectra of the radio access schemes can be recovered at the receiver side by exploiting the increased spectral redundancy (owing to cyclostationarity) at the transmitter.

How the user terminals 201 through 204, i.e., the receivers, process the above-described multiplexed transmission signal is described next. The user terminals 201 through 204, the receivers, use the known cyclic wiener filter or fractionally spaced equalizer (FSE), which is an application filter that exploits cyclostationarity, to separate the multiplexed transmission signals and to perform processing so as to compensate for an interfered and corrupted parts in their frequency spectra. This processing is described concretely hereinafter.

Figure 7:
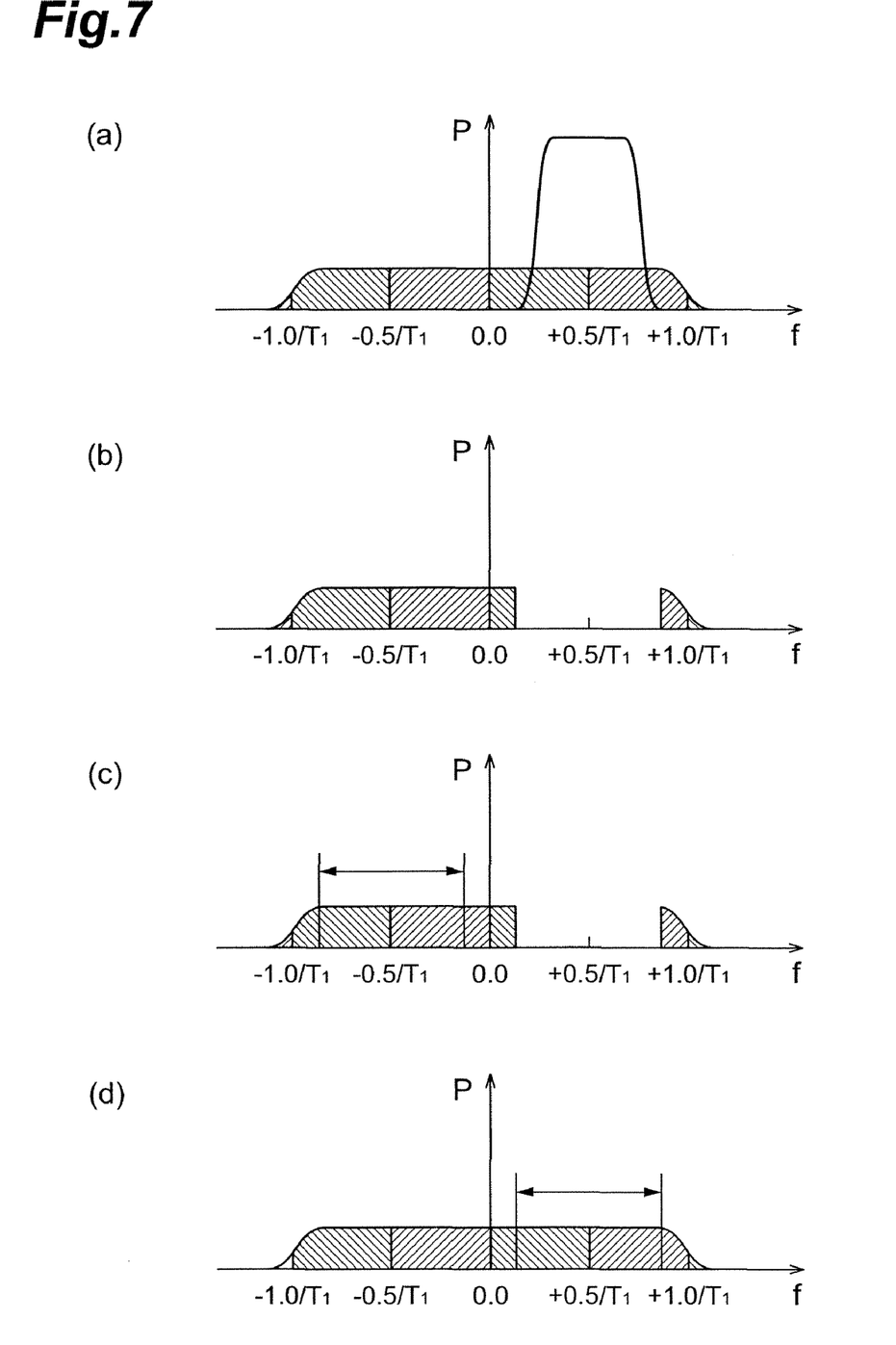
FIG. 7 is a schematic diagram showing the frequency spectrum of the processed received signal for extracting the frequency spectrum of a radio access scheme of a communication system 101 from a transmission signal processed in S105.

FIG. 7 is a schematic diagram showing the frequency spectrum of the processed received signal obtained from extracting the frequency spectrum of the radio access scheme of the communication system 101 from the transmission signal processed in S105 described above. A multiplexed transmission signal shown in (a) of FIG. 7 is received by the receiver. Then, as shown in (b) of FIG. 7, the frequency band that corresponds to the radio access scheme of the communication system 102 is zeroed. Next, as shown in (c) of FIG. 7, the frequency spectrum of the radio access scheme of the communication system 101 repeatedly forms a signal by means of exploiting its spectral redundancy owing to cyclostationarity; thus a frequency spectrum with the same frequency pattern as the zeroed frequency band is specified. Thereafter, as shown in (d) of FIG. 7, the specified frequency band is copied to the zeroed frequency band, whereby the transmission signal based on the radio access scheme of the communication system 101 is formed.

Figure 8:
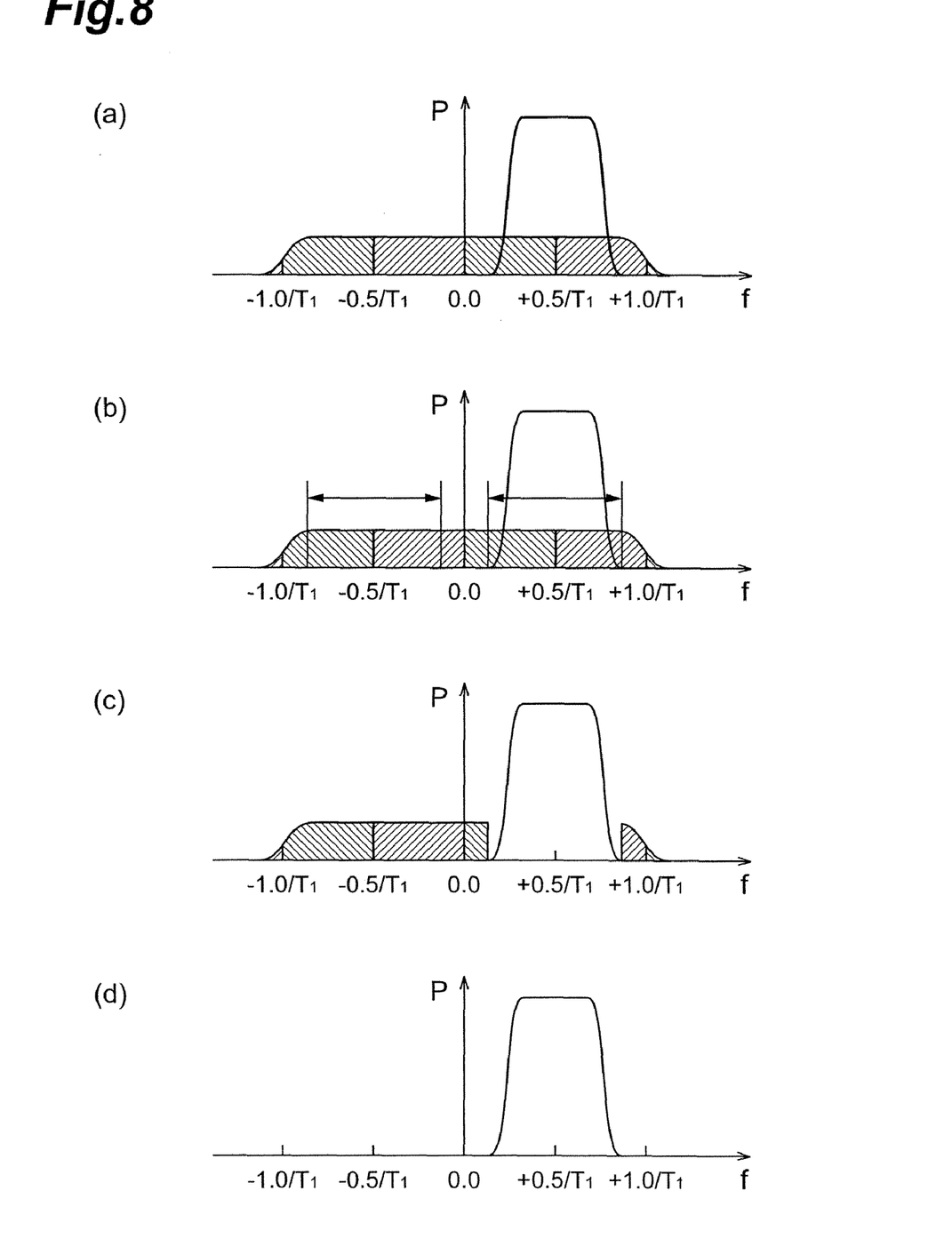
FIG. 8 is a schematic diagram showing the frequency spectrum of the processed received signal for extracting the frequency spectrum of a transmission signal based on a radio access scheme of a communication system 102.

Similarly, processing of extracting the transmission signal of the communication system 102 is described. FIG. 8 is a schematic diagram showing the frequency spectrum of the processed received signal for extracting the frequency spectrum of the transmission signal based on the radio access scheme of the communication system 102.

A multiplexed transmission signal shown in (a) of FIG. 8 is received by the receiver corresponding to communication system 102. As shown in (b) of FIG. 8, the frequency band that corresponds to the radio access scheme of the communication system 102 is interfered with the transmission signal based on the radio access scheme of the communication system 101. Therefore, other frequency spectrum in the transmission signal based on the radio access scheme of the communication system 101, which contains the same frequency pattern as the interfered spectrum part, is used to subtract interference from the received signal of the communication 102. Specifically, the process of subtracting other spectrum part from the interfered spectrum part is performed. Then, as shown in (c) of FIG. 8, the transmission signal based on the radio access scheme of the communication system 102, which is not interfered with the transmission signal based on the radio access scheme of the communication system 101, is extracted, and then the frequency spectrum of the transmission signal based on the radio access scheme of the communication system 101 is totally eliminated as shown in (d) of FIG. 8.

Figure 9:
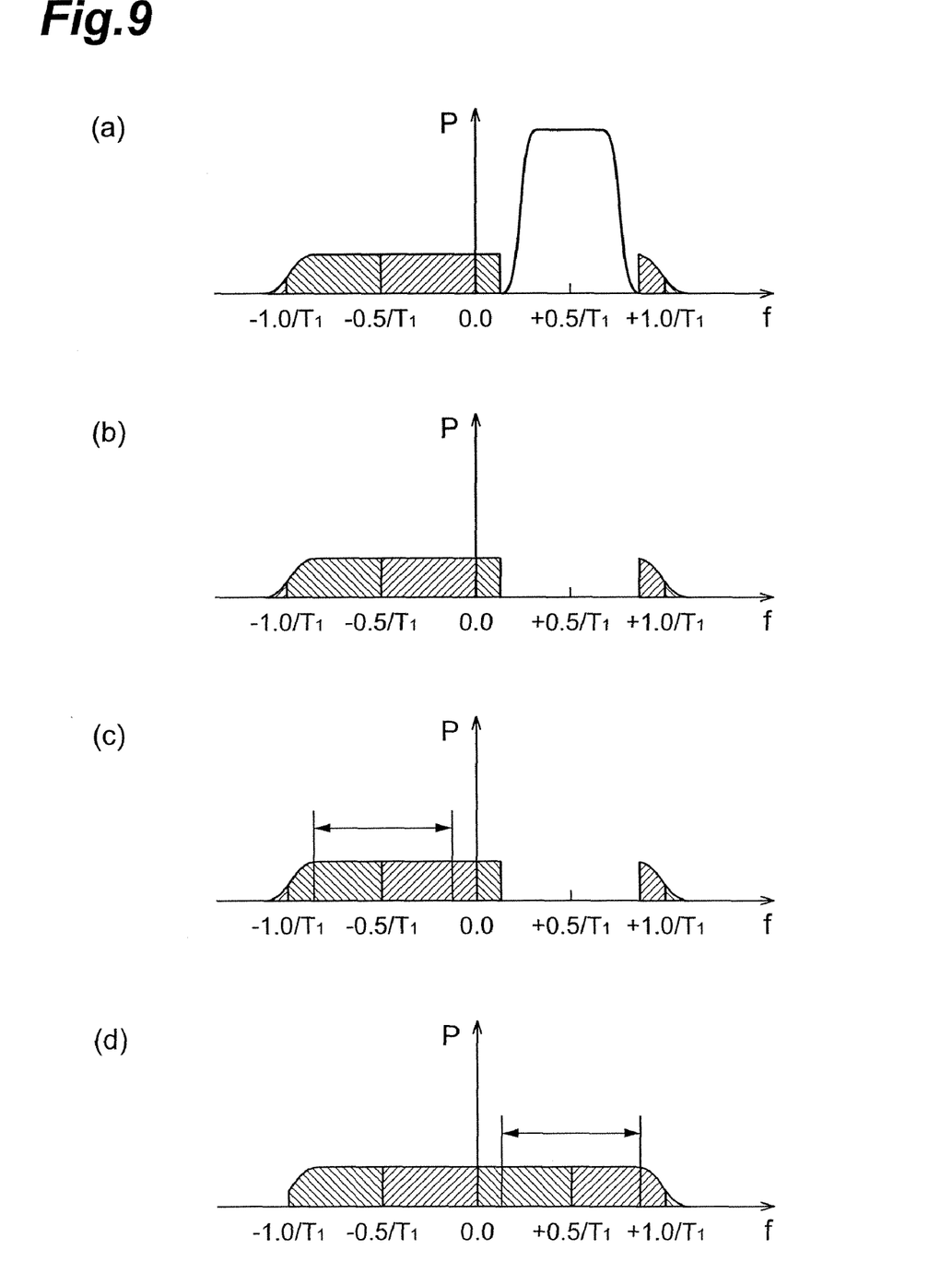
FIG. 9 is a schematic diagram showing the frequency spectrum of the processed received signal for extracting the frequency spectrum of the radio access scheme of the communication system 101 from a transmission signal processed in S106.

FIG. 9 is a schematic diagram showing the frequency spectrum of the processed received signal for extracting the frequency of the radio access scheme of the communication system 101 from the transmission signal processed in S106 described above. A multiplexed transmission signal shown in (a) of FIG. 9 is received by the receiver of the radio access scheme of the communication system 101. Then, as shown in (b) of FIG. 9, the interfered spectrum part that corresponds to the radio access scheme of the communication system 102 is first eliminated. Next, as shown in (c) of FIG. 9, the frequency spectrum of the radio access scheme of the communication system 101 repeatedly forms a signal by means of exploiting its spectral redundancy owing to cyclostationarity; thus a frequency spectrum with the same frequency pattern as the zeroed frequency band is specified. Thereafter, as shown in (d) of FIG. 9, the specified frequency band is copied to the zeroed frequency band, whereby the transmission signal based on the radio access scheme of the communication system 101 is formed.

Figure 10:
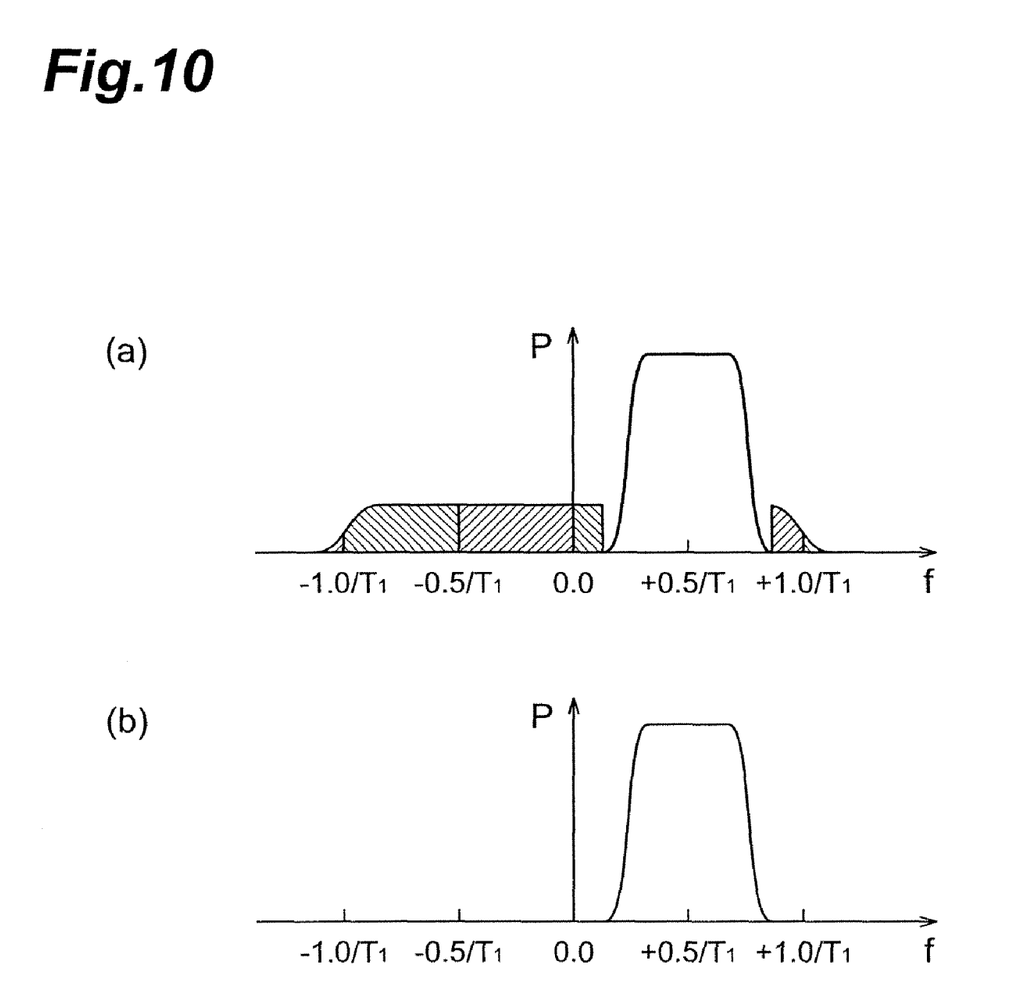
FIG. 10 is a schematic diagram showing the frequency spectrum of the processed received signal for extracting the frequency spectrum of the transmission signal based on the radio access scheme of the communication system 102.

Similarly, the process of extracting the transmission signal based on the radio access scheme of the communication system 102 is described. FIG. 10 is a schematic diagram showing the frequency spectrum of the processed received signal for extracting the frequency spectrum of the transmission signal based on the radio access scheme of the communication system 102.

As shown in (a) of FIG. 10, the transmission signal based on the radio access scheme of the communication system 101 and the transmission signal based on the radio access scheme of the communication system 102 are not interfered with each other on frequency spectrum of the radio access scheme of the communication system 102. Therefore, as shown in (b) of FIG. 10, by removing only the frequency band of the transmission signal based on the radio access scheme of the communication system 101, the transmission signal based on the radio access scheme of the communication system 102 is obtained.

Next, an operational effect of the base station 100 of the present embodiment is described. According to this base station 100, a transmission signal based on the first radio access scheme is generated in the communication system 101, a transmission signal based on the second radio access scheme different from the first radio access scheme is generated in the communication system 102, and the usage status of the frequency spectrum of the transmission signal based on the first radio access scheme, as well as the transmission parameter of the transmission signal based on the second radio access scheme, are determined by the pulse-shaping controller 105. Then the pulse-shaping controller 105 performs control so as to pulse-shape the transmission signal based on the first radio access scheme by means of the transmit filter 12. And the adder 106 generates a transmission signal by adding the pulse-shaped transmission signal based on the first radio access scheme to the pulse-shaped transmission signal based on the second radio access scheme, and the generated transmission signal can be transmitted via the antenna 110. Accordingly, the frequency utilization efficiency can be improved. By the way, the following alternative operation can be done. The pulse-shaping controller 105 performs control so as to pulse-shape the transmission signal based on the second radio access scheme by means of the transmit filter 22. And the adder 106 generates a transmission signal by adding the pulse-shaped transmission signal based on the second radio access scheme to the pulse-shaped transmission signal based on the first radio access scheme, and the generated transmission signal can be transmitted via the antenna 110.

Moreover, in the base station 100 the first radio access scheme of the communication system 101 uses a wideband signal, while the second radio access scheme of the communication system 102 uses a narrowband signal, and the transmission signal based on the first radio access scheme can be subjected to pulse-shaping so that the spectral redundancy owing to cyclostationarity increases. Then, the transmission signals are multiplexed. By exploiting spectral redundancy (owing to cyclostationarity), signal separation is possible at the receiver side. Accordingly, frequency utilization efficiency can be improved.

Moreover, in the base station 100, the first radio access scheme of the communication system 101 generates a wideband signal, while the second radio access scheme of the communication system 102 generates a narrowband signal that has a predetermined known hopping pattern, and the transmission signal based on the first radio access scheme can be subjected to pulse-shaping so that the spectral redundancy owing to cyclostationarity increases and that interference to the second radio access scheme is zeroed or is minimized in the frequency band corresponding to the hopping pattern. Accordingly, the transmission signals can be multiplexed while avoiding interference from the first radio access scheme of the communication system 101 to the second radio access scheme of the communication system 102. The notch owing to zeroing spectrum part of the first radio access scheme of the communication system 101 can be compensated for at the receiver by exploiting the increased spectral redundancy (owing to cyclostationarity) at the transmitter. Accordingly, the frequency utilization efficiency can be improved.

The disclosure of Japanese Patent Application No. 2006-066542 filed Mar. 10, 2006 including specification, drawings and claims is incorporated herein by reference in its entirety.

What is claimed is:

1. A transmission device, comprising:
a first communication control module that generates a first transmission signal based on a first radio access scheme, the first transmission signal corresponding to a first plurality of users;
a second communication control module that generates a second transmission signal based on a second radio access scheme different from the first radio access scheme, the second transmission signal corresponding to a second plurality of users;
a transmission parameter determining module that determines whether or not frequency resources are currently being used for the first transmission signal, and whether or not a transmission parameter of the second transmission signal is known to the first transmission signal;
a pulse-shaping control module, that on the basis of a determination result obtained by the transmission parameter determining module controls the first communication control module to generate a pulse-shaped first transmission signal;
an adding module that, when the first transmission signal is pulse-shaped on the basis of the control performed by the pulse-shaping control module, generates a combined transmission signal by adding the pulse-shaped first transmission signal to the second transmission signal; and
a transmitting module for transmitting the combined transmission signal generated by the adding module
wherein the transmission parameter is determined as known or unknown, when the transmission parameter is determined to be unknown to the first transmission signal, the pulse-shaping control module is configured to control the first communication control module to pulse-shape the first transmission signal to increase the spectral redundancy owing to cyclostationarity, and when the transmission parameter is determined to be known to the first transmission signal, the pulse-shaping control module is configured to control the first communication control module to pulse-shape the first transmission signal to increase spectral redundancy owing to cyclostationarity and to minimize interference to a frequency band occupied by the second transmission signal.

2. The transmission device according to claim 1, wherein the first transmission signal is a wideband signal and the second transmission signal is a narrowband signal.

3. The transmission device according to claim 1, wherein the first transmission signal is a wideband signal, the second transmission signal is a frequency hopping narrowband signal having a previously known hopping pattern and an occupied bandwidth, and the pulse-shaping control module controls the first communication control module to pulse-shape the first transmission signal to increase spectral redundancy owing to cyclostationarity and minimize a power of the first transmission signal in a frequency band occupied by the second transmission signal according to the hopping pattern of the second transmission signal.

4. A transmission method implemented on a transmission device, comprising:
generating, at the transmission device, a first transmission signal based on a first radio access scheme, the first transmission signal corresponding to a first plurality of users;
generating, at the transmission device, a second transmission signal based on a second radio access scheme different from the first radio access scheme, the second transmission signal corresponding to a second plurality of users;
determining, at the transmission device, whether or not frequency resources are currently being used for the first transmission signal, and whether or not a transmission parameter of the second transmission signal is known to the first transmission signal;
pulse-shaping, at the transmission device, the first transmission signal on the basis of the determination;
generating, at the transmission device, a combined transmission signal by adding the pulse-shaped first transmission signal to the second transmission signal when the first transmission signal is pulse-shaped; and
transmitting, at the transmission device, the combined transmission signal,
wherein the transmission parameter is determined as known or unknown, when the transmission parameter is determined to be unknown to the first transmission signal, the first transmission signal is pulse-shaped to increase the spectral redundancy owing to cyclostationarity, and when the transmission parameter is determined to be known to the first transmission signal, the first transmission signal is pulse-shaped to increase spectral redundancy owing to cyclostationarity and to minimize interference to a frequency band occupied by the second transmission signal.

5. The transmission method according to claim 4, wherein the first transmission signal is a wideband signal and the second transmission signal is a narrowband signal.

6. The transmission method according to claim 4, wherein the first transmission signal is a wideband signal, the second transmission signal is a frequency hopping narrowband signal having a previously known hopping pattern and an occupied bandwidth, and the first transmission signal is pulse-shaped to increase spectral redundancy owing to cyclostationarity and to minimize a power of the first transmission signal in a frequency band occupied by the second transmission signal according to the hopping pattern of the second transmission signal.

* * * * *